Patented Jan. 2, 1951

2,536,122

UNITED STATES PATENT OFFICE 2,536,122

PREPARATION OF MULLITE

Orlando Leonard Bertorelli and Ira Williams, Borger, Tex., assignors to J. M. Huber Corporation, Borger, Tex., a corporation of Delaware No Drawing. Application February 8, 1946, Serial No. 646,487

6 Claims. (Cl. 23—110)

This invention relates to the preparation of mullite, and particularly to the preparation of mullite low in iron.

Clay substances are the weathered products of silicate rocks and consist chiefly of a hydrated aluminum silicate. In general, these substances are composed primarily of $Al_2O_3.2SiO_2.2H_2O$. Representative of such clay substances are kaolinite, the primary and secondary kaolins, china clays, ball clays, fire clays, and the bauxite clays which contain a larger proportion of alumina than kaolinite.

It is well known that such clay substances may be converted to mullite and free silica by heating them at temperatures of from about 1050° C. to about 1450° C. The silica can be removed from such mixture by dissolving it out with alkali. Mullite is a highly refractory material which is resistant to corrosion and has a low coefficient of expansion. It is valuable for the formation of highly refractory ceramic bodies.

Clay substances contain iron. The methods heretofore proposed for making mullite do not remove any substantial proportion of the iron. Iron is usually objectionable in mullite as it tends to color the fired article and lower its fusion temperature, and, for certain uses such as the construction of glass tanks, tends to discolor the products with which it comes into contact.

Most light colored clays contain the iron in a form in which it is not easily attacked and wherein it probably forms a part of the complicated structure of the clay substance. Many attempts have been made to reduce the iron content of clay substances, and particularly of the various kaolins. One suggested method consists in treating the kaolin as a slurry of finely divided material with acids, and particularly with acids of a reducing nature such as oxalic acid. Another proposed method consists of treating the clay with strong reducing agents such as sodium hydrosulfite, in the presence of strong non-oxidizing mineral acids. Still another proposed method consists in firing the clay in the presence of a volatile chloride such as aluminum chloride. Such treatments serve to slightly increase the brightness of light colored clays to remove only a small proportion of the iron. For example, a Georgia kaolin containing 0.70% of iron calculated as ferric oxide, after being bleached with sodium hydrosulfite and sulfuric acid still contained 0.681% of iron.

Clay substances, as mined, are in the form of large lumps, usually weighing from one-half pound up to 100 pounds or more, with most of the weight being in the large pieces. Such clay contains natural ground moisture, usually from about 15% to about 20%. Mullite has been prepared heretofore by calcining the clay substances in lump form, whereupon the clay sinters together. Such sintered lumps are then ground and the ground material treated with caustic to remove the silica. Mullite, as thus prepared, contains substantially all of the iron originally present in the clay substance.

It is an object of the present invention to provide an improved method for producing mullite. Another object is to provide a method for producing mullite low in iron. A further object is to provide a method for producing mullite whereby a substantial proportion of the original iron content of the clay substance is removed, particularly by volatilization. Other objects are to advance the art. Still other objects will appear hereinafter.

The above and other objects may be accomplished in accordance with our invention, wherein mullite low in iron is prepared from an iron-containing clay substance by drying the clay substance, grinding the dried clay substance to a powder which will pass through a 2.5 mesh screen, then heating the powder at a temperature of from about 1050° C. to about 1450° C. for a sufficient period of time to convert the clay substance to mullite, removing volatilized materials from the powder during the heating. We have found that, by operating in this manner, we can remove a considerable proportion of the tightly held iron from the clay substances and produce mullite of substantially lower iron content than by any other known method.

The clay substances which are to be treated in accordance with our invention should be sufficiently free of fluxing impurities so that the sintering temperature of the powder will be above the temperature of heating. In order for the clay substance to lose an important portion of its iron, it must remain in a state of fine division during the heating, and hence, clays which contain considerable amounts of fluxing impurities are not well suited to this process. Common fluxing impurities are iron, calcium and magnesium.

The clay substance may be heated at any temperature between about 1050° C. and 1450° C. for from about 30 minutes to about 4 hours. The time of heating will depend largely upon the temperature, as the reaction to form mullite takes place more rapidly at the higher temperatures. Ordinarily, we prefer to employ temperatures of from about 1250° C. to about 1400° C.

The heating may be carried out in various types of equipment and by different methods. Preferably, the type of equipment and method employed should be such as to expose a large surface of the clay to the atmosphere, as by heating the powder in thin layers of from about one-half inch to about one inch thick. The process is more effective if the clay is stirred occasionally during the heating. A particularly satisfactory method consists in heating the powdered clay i na rotary kiln.

Direct or indirect heat may be employed. Preferably, the heating is carried out by passing hot inert gases over or through the powder, whereby the hot gases remove volatilized materials. By inert gases, we mean gases which do not react with mullite or kaolinite. The gases may be oxidizing or reducing. Preferably, the gases are combustion gases which are neither strongly oxidizing nor reducing. Such combustion gases may be obtained from any suitable fuel such as coal, wood, gas, oil and the like. The vessel containing the clay may be heated and gases caused to flow over the clay merely for the purpose of removing volatilized materials.

The clay substance must be dried before grinding in order to produce a powder. It should be ground sufficiently to pass through a 2.5 mesh screen, and, preferably, so that the major proportion of the clay will pass through a 20 mesh screen. The proportion of iron which will be removed will be dependent upon the fineness of the powder. We have found that particularly valuable results are obtained if the clay substance is ground so that it will pass through a 60 mesh screen. Powder of the desired fineness may be obtained by incomplete grinding, followed by sieving to separate the larger pieces from the powder.

If it is desired to separate the mullite from the free silica, the finely divided calcined product may be treated with an aqueous caustic alkali solution such as caustic soda or caustic potash. Such caustic solution will readily dissolve the silica, and relatively pure mullite may then be obtained by filtering and washing the filter cake. The caustic solutions may contain the caustic in a concentration of from about 3% to about 30%. Preferably, the caustic solution will contain the caustic in a concentration of approximately 20%.

The amount of the caustic solution will depend upon the amount of silica in the mixture to be treated and on the desired fluidity for convenient handling. The concentration of caustic will also be dependent upon the type of silicate desired. Lesser amounts of caustic produce silicates containing a higher ratio of silica to alkaline oxide. In general, from about 0.5 mol to about 1 mol of caustic is used for each mol of silica.

The extraction with caustic may be carried out at any desired temperature. However, it will generally be desired to carry out the extraction at elevated temperatures near the boiling temperature of the caustic solution, as the rate of reaction increases with the temperature. Thus, the extraction may be carried out most rapidly at the highest temperatures.

Another method of eliminating the free silica from the mullite consists in mixing the calcined powder with an aluminous substance such as aluminum hydrate or alum, followed by a heat treatment to cause the aluminous substance to react with the free silica to convert it to mullite. This method usually produces a final product in the form of lumps.

In order to more clearly illustrate our invention, preferred modes of carrying the same into effect and the advantageous results to be obtained thereby, the following examples are given.

*Example 1*

South Carolina kaolin, containing 0.65% of iron calculated as $Fe_2O_3$, was used in this test. Fifty-eight (58) pounds of clay, 98% of which would pass a 325 mesh screen, was calcined in a thin layer with frequent stirring for one hour at 1300° C. This was slurried in 12 gallons of water containing 24 pounds of caustic soda, and held at boiling temperature for one hour. The product was filtered and the filter cake washed under suction with hot water. After drying, the mullite weighed 31 pounds and contained 0.30% of $Fe_2O_3$.

One hundred (100) grams of the uncalcined clay was slurried in 500 cc. of water and treated with 5 grams of sulfuric acid and one gram of sodium hydrosulfite. The recovered clay was found to contain 0.63% of iron calculated as $Fe_2O_3$.

*Example 2*

Georgia kaolin, which contained 0.803% of iron calculated as $Fe_2O_3$, was dried, ground and screened into various sized particles. The various sizes were calcined at 1250° C. for 90 minutes and the amount of iron determined. The calcined material was then ground and extracted with caustic soda and the iron determined in the resulting mullite. In the absence of loss of iron during the calcining, the calcined clay should contain 0.935% iron and the mullite should contain 1.464% iron. The following results were obtained.

| Size Particles | Per Cent Iron as $Fe_2O_3$ | | Per Cent Iron Removed by Calcining |
|---|---|---|---|
| | In Calcined | In Mullite | |
| .5 inch | .891 | 1.395 | 4.71 |
| .31 | .618 | .970 | 33.9 |
| .047 to .093 inch | .558 | .877 | 40.3 |
| .033 to .047 inch | .555 | .871 | 40.6 |
| .016 to .033 inch | .504 | .790 | 46.0 |
| .007 to .016 inch | .495 | .776 | 47.0 |
| .0059 to .007 inch | .494 | .775 | 47.1 |
| Less than .0059 inch | .337 | .528 | 63.9 |

*Example 3*

A sample of ball clay from Newport, Kentucky contained 1.74% of iron calculated as $Fe_2O_3$. This was calcined for 3 hours at 1200° C. in the form of ½ inch lumps and in the form of a fine powder, substantially all of which would pass a 60 mesh screen. After calcining, the iron content was found to be 1.960% in the lumps and .805% in the powder.

*Example 4*

A sample of Mayfield ball clay, containing 1.65% of iron calculated as $Fe_2O_3$, was calcined for 2 hours in a ½ inch layer at 1250° C. One sample was in the form of ½ inch lumps and the other as a fine powder substantially all of which would pass a 60 mesh screen. The amount of iron found was 1.81% for the lumps and 1.075% for the powder. The calcined lumps were ground and both samples were extracted with boiling caustic potash solution and the products filtered, washed and dried. The iron, calculated as $Fe_2O_3$ in the resulting mullite, was 2.40% for the lumps and 1.425% for the powder.

It will be understood that the preceding examples are given for illustrative purposes solely, and that various modifications and variations may be made therein without departing from the spirit or scope of our invention. For example, other clay substances, which are composed primarily of kaolinite and which are sufficiently free of fluxing impurities, may be substituted for the clay substances of the examples. Also, other temperatures in the range of from about 1050° C. to about 1450° C. may be employed. Furthermore, the mixture of mullite and silica obtained by the heating and before extraction with caustic will be useful for some purposes, and, hence, it may be undesired to follow the heating with an extraction.

It will thus be apparent that, by our invention, we have provided a new and improved process for producing mullite, and which is particularly advantageous for producing mullite low in iron. Such mullite is a valuable material which has many advantages over mullite obtained by the prior processes. It will thus be apparent that our invention constitutes a valuable contribution and advancement in the art.

We claim:

1. The process for preparing mullite low in iron from an iron-containing clay substance which comprises the steps of drying the clay substance, grinding the dried clay substance to particles substantially all of which will pass through a 2.5 mesh screen and the major proportion of which will pass through a 20-mesh screen, then heating the ground clay substance at a temperature of from about 1050° C. to about 1450° C. for sufficient time to convert it to mullite, and exposing the surfaces of the ground clay substance to flowing inert gases during the heating, the clay substance being sufficiently free of fluxing impurities so that the sintering temperature of the ground clay substance will be above the temperature of heating.

2. The process for preparing mullite low in iron from an iron-containing clay substance which comprises the steps of drying the clay substance, grinding the dried clay substance to a powder which will pass through a 60 mesh screen, then heating the powder at a temperature of from about 1050° C. to about 1450° C. for sufficient time to convert it to mullite, and exposing the surfaces of the ground clay substance to flowing inert gases during the heating, the clay substance being sufficiently free of fluxing impurities so that the sintering temperature of the powder will be above the temperature of heating.

3. The process for preparing mullite low in iron from an iron-containing clay substance which comprises the steps of drying the clay substance, grinding the dried clay substance to particles which will pass through a 2.5-mesh screen, then heating the ground clay substance at a temperature of from about 1050° C. to about 1450° C. for sufficient time to convert it to mullite, exposing large surfaces of the ground clay substance to flowing combustion gases during the heating, the clay substance being sufficiently free of fluxing impurities so that the sintering temperature of the ground clay substance will be above the temperaure of heating.

4. The process for preparing mullite low in iron from an iron-containing clay substance which comprises the steps of drying the clay substance, grinding the dried clay substance to particles which will pass through a 2.5-mesh screen, then heating the ground clay substance at a temperature of from about 1250° C. to about 1400° C. for sufficient time to convert it to mullite, and exposing the surfaces of the ground clay substance to flowing inert gases during the heating, the clay substance being sufficiently free of fluxing impurities so that the sintering temperature of the ground clay substance will be above the temperature of heating.

5. The process for preparing mullite low in iron from an iron-containing clay substance which comprises the steps of drying the clay substance, grinding the dried clay substance to particles which will pass through a 2.5 mesh screen, then heating the ground clay substance at a temperature of from about 1050° C. to about 1450° C. for sufficient time to convert it to mullite, by passing hot combustion gases over the ground clay substance, the clay substance being sufficiently free of fluxing impurities so that the sintering temperature of the ground clay substance will be above the temperature of heating.

6. The process for preparing mullite low in iron from an iron-containing clay substance which comprises the steps of drying the clay substance, grinding the dried clay substance to particles substantially all of which will pass through a 2.5 mesh screen and the major proportion of which will pass through a 20-mesh screen, then heating the ground clay substance at a temperature of from about 1050° C. to about 1450° C. for sufficient time to convert it to mullite, and exposing the surfaces of the ground clay substance to flowing inert gases during the heating, the clay substance being sufficiently free of fluxing impurities so that the sintering temperature of the ground clay substance will be above the temperature of heating, dissolving the silica from the resulting product with aqueous caustic alkali, filtering off the resulting solution, and washing the filtered mullite.

ORLANDO LEONARD BERTORELLI.
IRA WILLIAMS.

REFERENCES CITED

The following references are of record in the file of this patent:

UNITED STATES PATENTS

| Number | Name | Date |
| --- | --- | --- |
| 788,131 | Glynn | April 25, 1905 |
| 1,363,387 | Boggs | Dec. 28, 1920 |
| 1,585,826 | Betts | May 25, 1926 |
| 1,944,856 | Willetts | Jan. 23, 1934 |
| 2,143,310 | Fulda | Jan. 10, 1939 |

OTHER REFERENCES

Thorpe, Dictionary of Applied Chemistry 4th ed., vol. 1, page 268. London, Longmans, Green and Co. 1941.

Mellor, Inorganic and Theoretical Chemistry, vol. 6, page 905. London, Longmans, Green and Co. 1925.

Abstract of article by Takeo Ao, Chemical Abstracts, vol. 28, page 598 (1934).